US008317954B2

(12) United States Patent
Chitraker et al.

(10) Patent No.: US 8,317,954 B2

(45) Date of Patent: Nov. 27, 2012

(54) LABEL AFFIXING SYSTEM

(75) Inventors: Rojan Chitraker, Singapore (SG); Robert Lanzendorf, Charlotte, NC (US)

(73) Assignees: Kabushiki Kaisha Sato (JP); Kabushiki Kaisha Sato Chishiki Zaisam Kenkyusyo (JP)

( * ) Notice: Subject to any disclaimer, the term of this patent is extended or adjusted under 35 U.S.C. 154(b) by 397 days.

(21) Appl. No.: 12/667,271

(22) PCT Filed: Feb. 25, 2009

(86) PCT No.: PCT/JP2009/053343

§ 371 (c)(1),
(2), (4) Date: Jan. 13, 2010

(87) PCT Pub. No.: WO2009/107623

PCT Pub. Date: Sep. 3, 2009

(65) Prior Publication Data

US 2010/0314024 A1 Dec. 16, 2010

(30) Foreign Application Priority Data

Feb. 29, 2008 (JP) ................................ 2008-050353

(51) Int. Cl.
*B32B 41/00* (2006.01)

(52) U.S. Cl. .......... 156/64; 156/235; 156/256; 156/360; 156/378; 156/379; 156/510; 156/538; 156/539; 156/552; 156/556; 156/DIG. 2; 156/DIG. 25; 156/DIG. 27; 156/DIG. 44; 156/DIG. 45; 156/DIG. 47

(58) Field of Classification Search .................... 156/64, 156/235, 256, 360, 378, 379, 510, 538, 539, 156/552, 556, DIG. 2, DIG. 25, DIG. 27, 156/156/DIG. 44, DIG. 45, DIG. 47
See application file for complete search history.

(56) References Cited

U.S. PATENT DOCUMENTS 5,232,539 A * 8/1993 Carpenter et al. ............ 156/360
6,401,936 B1 * 6/2002 Isaacs et al. .................. 209/656

FOREIGN PATENT DOCUMENTS

JP 2-109893 A 4/1990
JP 11-245923 A 9/1999
JP 2001-080621 A 3/2001
JP 2002-145227 5/2002
JP 2003-104532 A 4/2003
JP 2004-106915 4/2004

OTHER PUBLICATIONS

International Search Report dated Jun. 9, 2009, issued in corresponding international application No. PCT/JP2009/053343.
English translation of Japanese Notice of Reasons for Rejection, dated Jul. 2, 2012, issued in corresponding Japanese Patent Application No. JP2008-050353 Total 3 pages.

* cited by examiner

*Primary Examiner* — Katarzyna Wyrozebski Lee
*Assistant Examiner* — Joshel Rivera
(74) *Attorney, Agent, or Firm* — Ostrolenk Faber LLP

(57) ABSTRACT

A label affixing system with which a signal can be supplied to a label affixing machine from an image capturing unit which detects a conveyed object to be labeled. The label affixing system includes a plurality of conveyance lines, a CCD for capturing an image of the conveyed object, and a label affixing machine that includes a plurality of printing formats and affixes a printed label to the conveyed object. The system measures a distance to the conveyed object subjected to image capture by the CCD; selects one printing format from the plurality of printing formats on the basis of the measured distance to the conveyed object; prints the label on the basis of the selected printing format; and affixes the printed label to the conveyed object.

8 Claims, 6 Drawing Sheets

1

LABEL AFFIXING SYSTEM

CROSS REFERENCE TO RELATED APPLICATION

The present application is a 35 U.S.C. §§371 national phase conversion of PCT/JP2009/053343, filed Feb. 25, 2009, which claims priority of Japanese Application No. 2008-050353, filed Feb. 29, 2008, incorporated by reference herein. The PCT International Application was published in the Japanese language.

BACKGROUND OF THE INVENTION

1. Field of the Invention

The present invention relates to a label affixing system for affixing a label on which predetermined content is printed, onto a conveyed object conveyed by a conveyance device.

2. Description of the Related Art

A conventional label affixing system will be described on the basis of FIG. 6.

The label affixing system is provided with a conveyance line, detectors 63, 64, a computer 65, and a label affixing machine 66.

The conveyance line is comprised of two lines, namely a first conveyance line 61 and a second conveyance line 62, such that a different type of packaging box (conveyed object) 60*a*, 60*b* can be conveyed along each line.

The detector 63 for detecting the packaging box 60*a* is provided to the side of the first conveyance line 61.

The detector 64 for detecting the packaging box 60*b* is provided to the side of the second conveyance line 62.

The detectors 63, 64 are electrically connected to the computer 65, to be described below.

The detector 63 is capable of supplying a detection signal to the computer 65 upon detection of the conveyed packaging box 60*a*.

The detector 64 is capable of supplying a detection signal to the computer 65 upon detection of the conveyed packaging box* 60*b*.

The computer 65 includes a control unit having various programs, a work area, and so on, a storage unit, and so on (not shown in the drawings).

The storage unit stores a plurality of printing formats, printing data such as alphabetic characters and graphics, and so on.

The printing format and printing data can be supplied to the label affixing machine 66, to be described below, as a printing pattern.

The computer 65 is electrically connected to the label affixing machine 66.

For example, when a detection signal is supplied to the computer 65 from the detector 63, the computer 65 determines that the first conveyance line 61 is operative, and can therefore call up a first printing format corresponding to the packaging box 60*a* and first printing data corresponding to the first printing format from the storage unit.

The first printing format and first printing data called up from the storage unit can then be transmitted to the label affixing machine 66 from the computer 65 as a first printing pattern.

Further, when a signal is supplied to the computer 65 from the detector 64, the computer 65 determines that the second conveyance line 62 is operative, and can therefore call up a second printing format corresponding to the packaging box 60*b* and second printing data corresponding to the second printing format from the storage unit.

The second printing format and second printing data called up from the storage unit can then be transmitted to the label affixing machine 66 from the computer 65 as a second printing pattern.

Upon reception of the first printing pattern, the label affixing device 66 can print a label L in accordance with the first printing pattern on the basis of the printing pattern transmitted from the computer 65.

The printed label can then be affixed to the packaging box 60*a* conveyed by the first conveyance line 61.

Upon reception of the second printing pattern, the label affixing device 66 can print the label L in accordance with the second printing pattern on the basis of the printing pattern transmitted from the computer 65.

The printed label L can then be affixed to the packaging box 60*b* conveyed by the second conveyance line 62.

However, the need to record a plurality of printing formats and printing data in the computer leads to an increase in the scale of the system and an increase in the amount of space that needs to be secured.

Moreover, the computer must receive a signal from one of the detectors and transmit printing information to the label affixing machine, and therefore cables connecting the computer, the detectors, and the label affixing machine to each other must be laid, leading to an increase in cable length and the generation of noise, static electricity, and so on during laying of the cable.

Japanese Unexamined Patent Application Publication H2-109893 discloses a system in which a labeling robot, a camera, a conveyor, and so on are electrically connected to a computer, and two conveyors are arranged side by side.

SUMMARY OF THE INVENTION

The present invention has been designed in consideration of the problems described above, and an object thereof is to provide a label affixing system with which a signal can be supplied to a label affixing machine from a detector for detecting a conveyed object.

Another object of the present invention is to provide a label affixing system with which an increase in the scale of the system can be prevented and a space-saving can be achieved.

The present invention focuses on an image data signal, comprising in one aspect a label affixing system including a conveyance line for conveying a conveyed object, image capturing means for capturing an image of the conveyed object, and a label affixing machine that includes a plurality of printing formats and affixes a printed label to the conveyed object, the label affixing system comprising: a measuring step of measuring a distance to the conveyed object using data relating to the image captured by the image capturing means; a selecting step of selecting one printing format from the plurality of printing formats on the basis of the measured distance to the conveyed object; a printing step of printing the label on the basis of the selected printing format; and an affixing step of affixing the printed label to the conveyed object.

In a second aspect of a label affixing system, the conveyance line comprises a first conveyance line and a second conveyance line. The label affixing system further comprises: a specifying step of specifying the first conveyance line or the second conveyance line by specifying the distance to the conveyed object on the basis of the data relating to the image captured by the image capturing means; and a conveyance halting step of halting driving of the second conveyance line after determining that the conveyed object is being conveyed by the first conveyance line.

In a further aspect, the label affixing machine comprises storage means for storing the plurality of printing formats and printing data.

The label affixing system of the present invention is capable of measuring the distance to a conveyed object using an image capturing unit for detecting the conveyed object, and printing a label in accordance with a predetermined printing format on the basis of the distance to the conveyed object.

Further, information relating to the conveyed object can be supplied to a label affixing machine from the image capturing unit, thereby eliminating the need for a computer such that the scale of the system does not increase.

Further, a plurality of printing formats, alphabetic character data, and so on can be stored in the label affixing machine, thereby eliminating the need for a computer such that space-saving can be realized.

DESCRIPTION OF THE PREFERRED EMBODIMENTS

An embodiment of the present invention will be described below on the basis of FIGS. 1 to 5.

Figure 1:
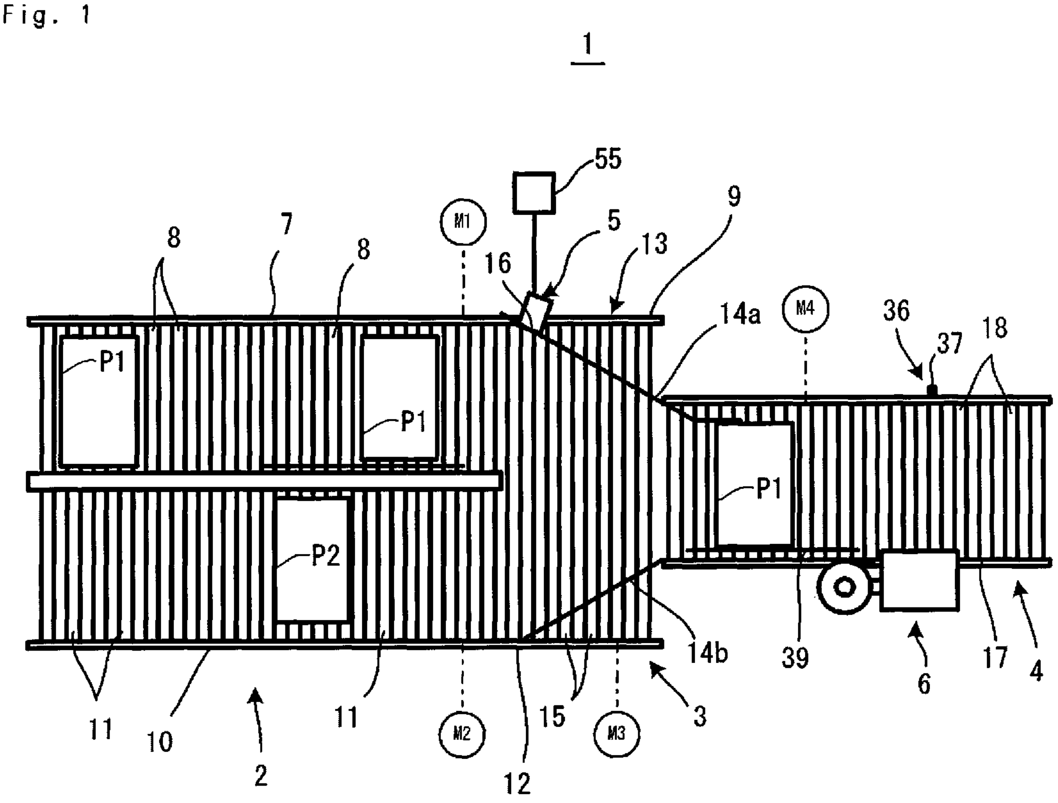
FIG. 1 is an overall schematic constitutional diagram showing an example of a label affixing system according to the present invention.
Figure 2:
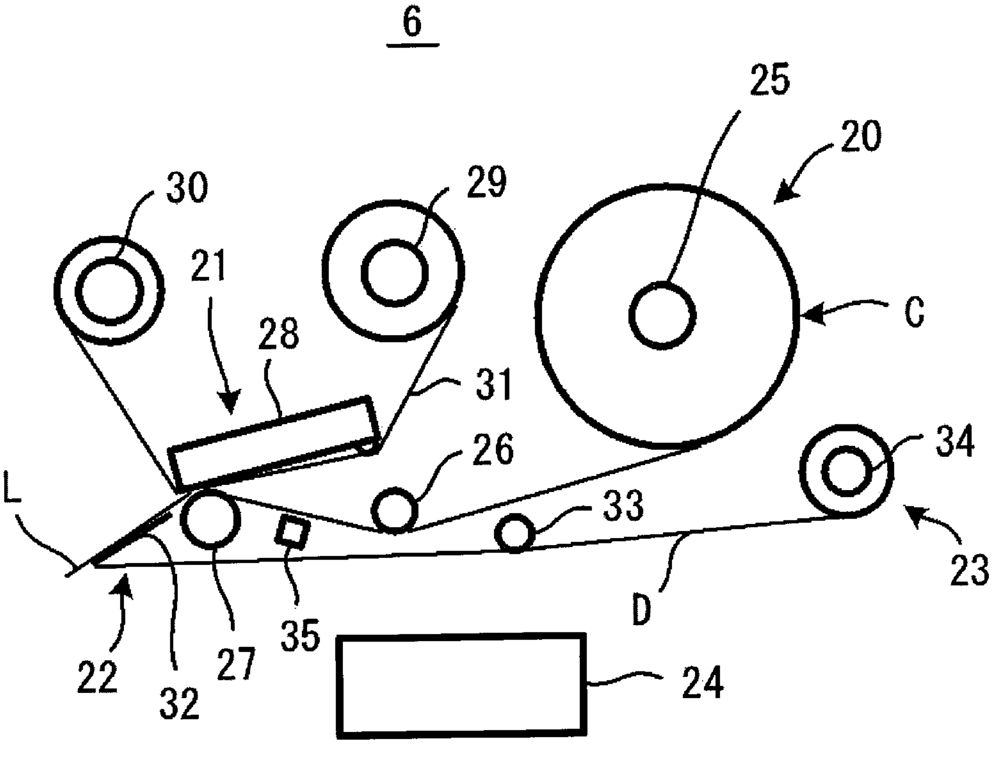
FIG. 2 is a schematic constitutional diagram showing an example of a label affixing machine.
Figure 3:
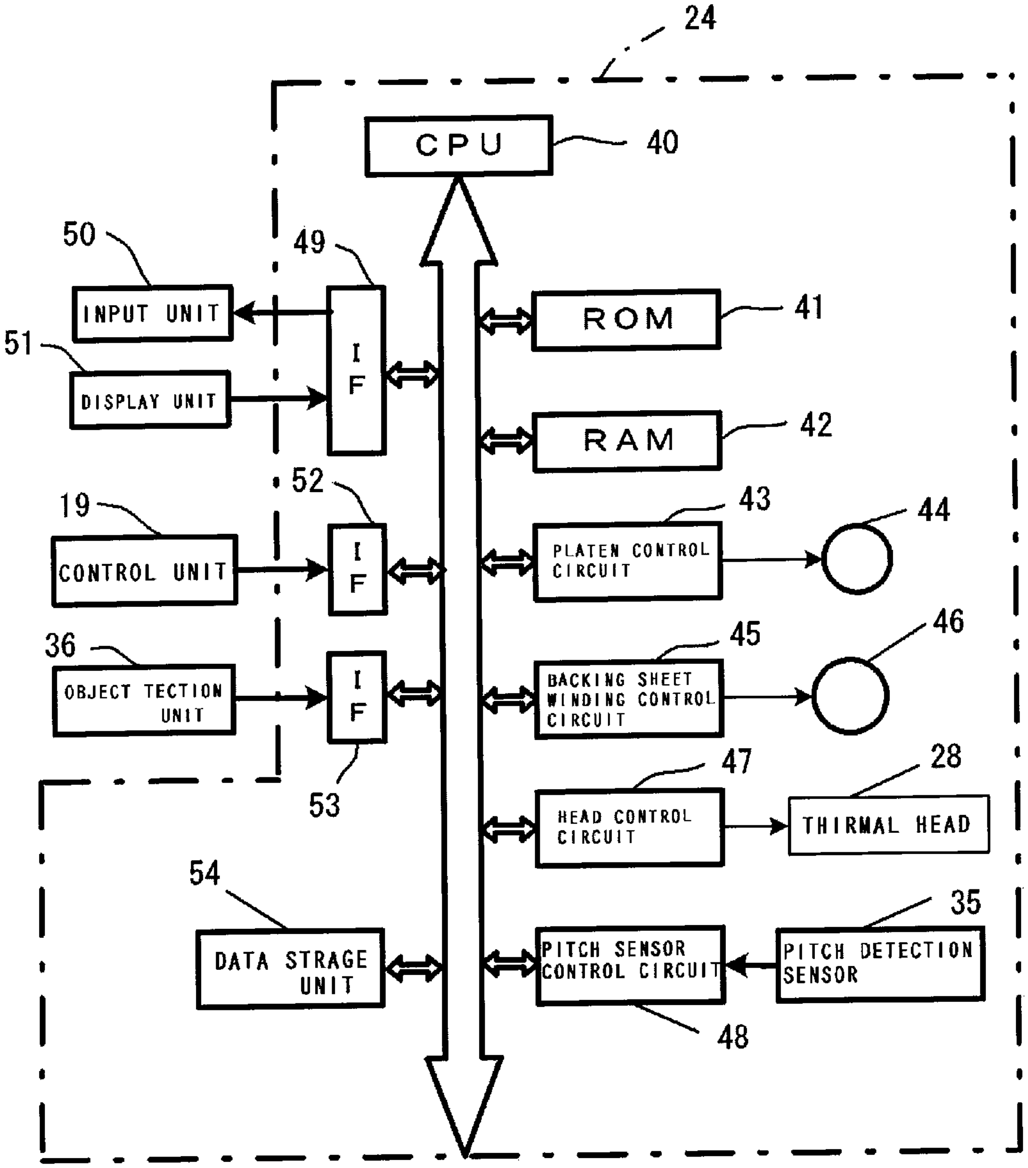
FIG. 3 is a block diagram illustrating a printing control unit of the label affixing machine.
Figure 4:
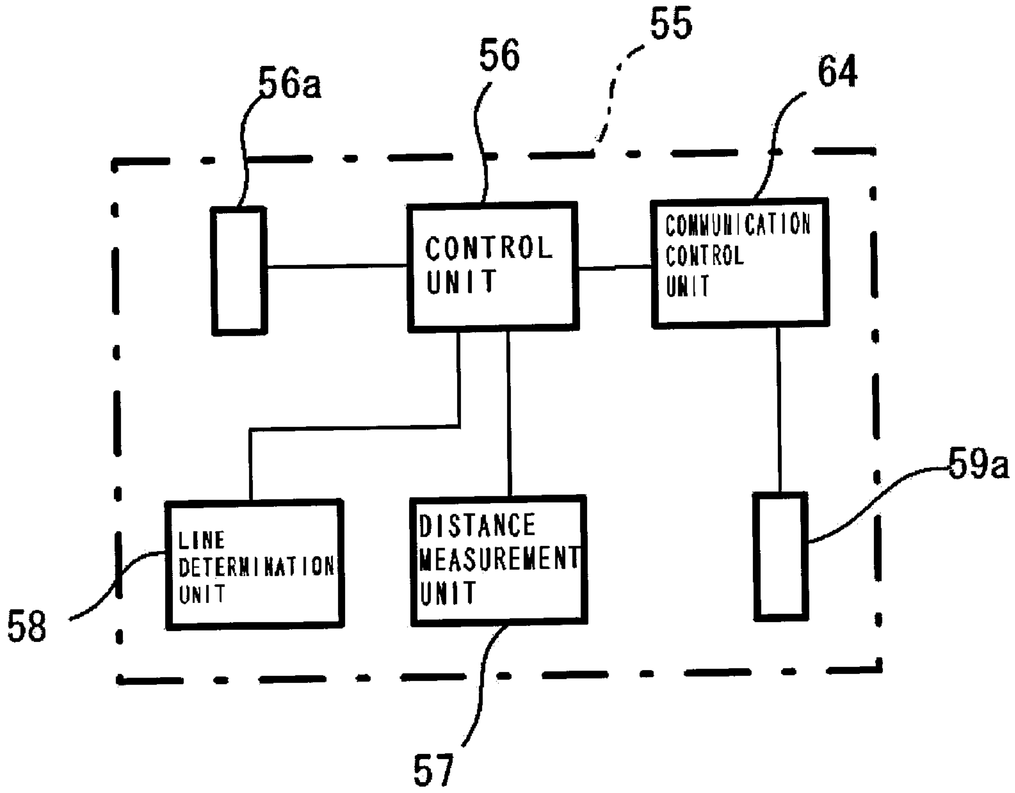
FIG. 4 is a block diagram showing an example of a control box.
Figure 5:
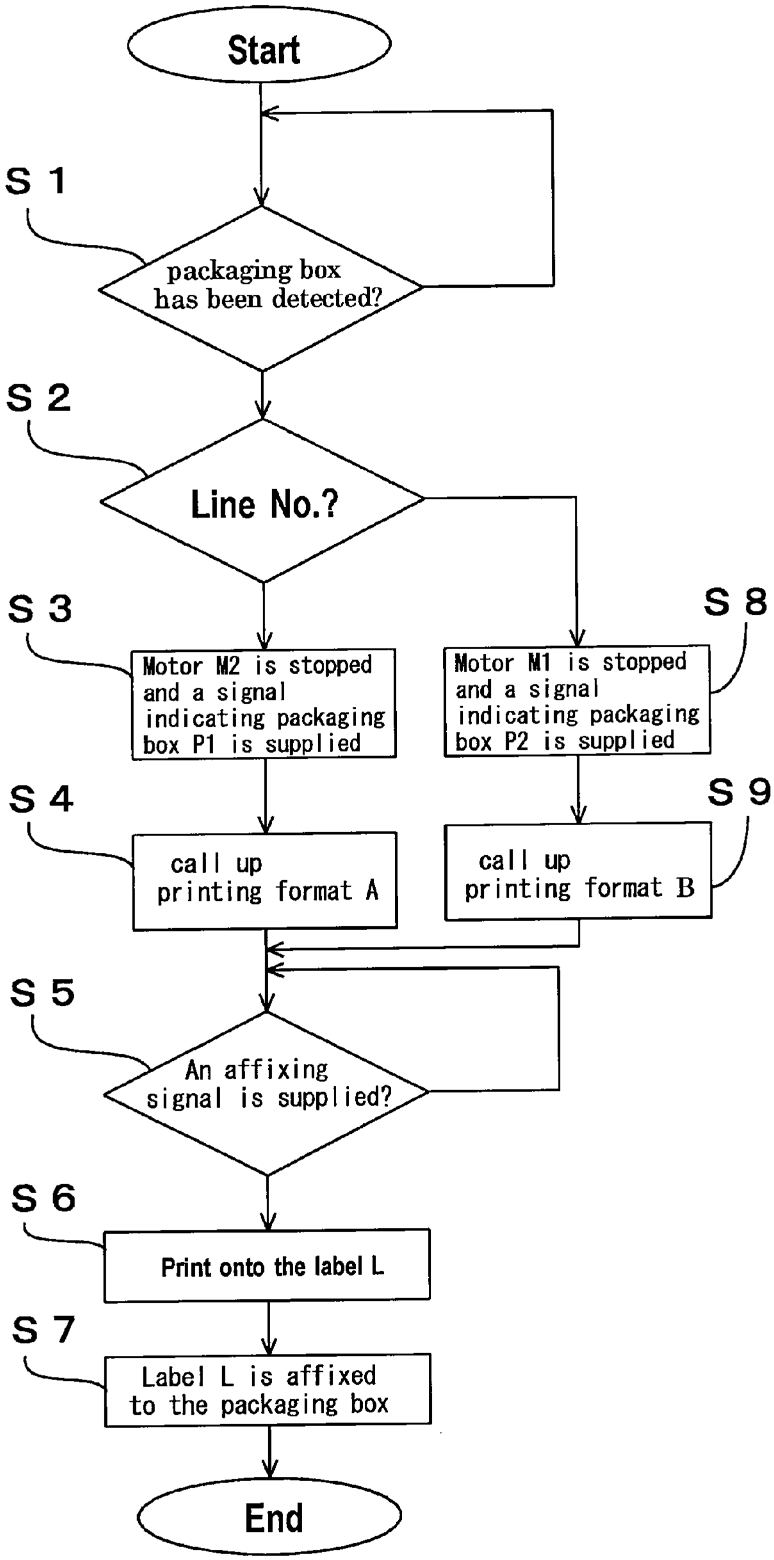
FIG. 5 is a flowchart illustrating an operation of the label affixing system.
Figure 6:
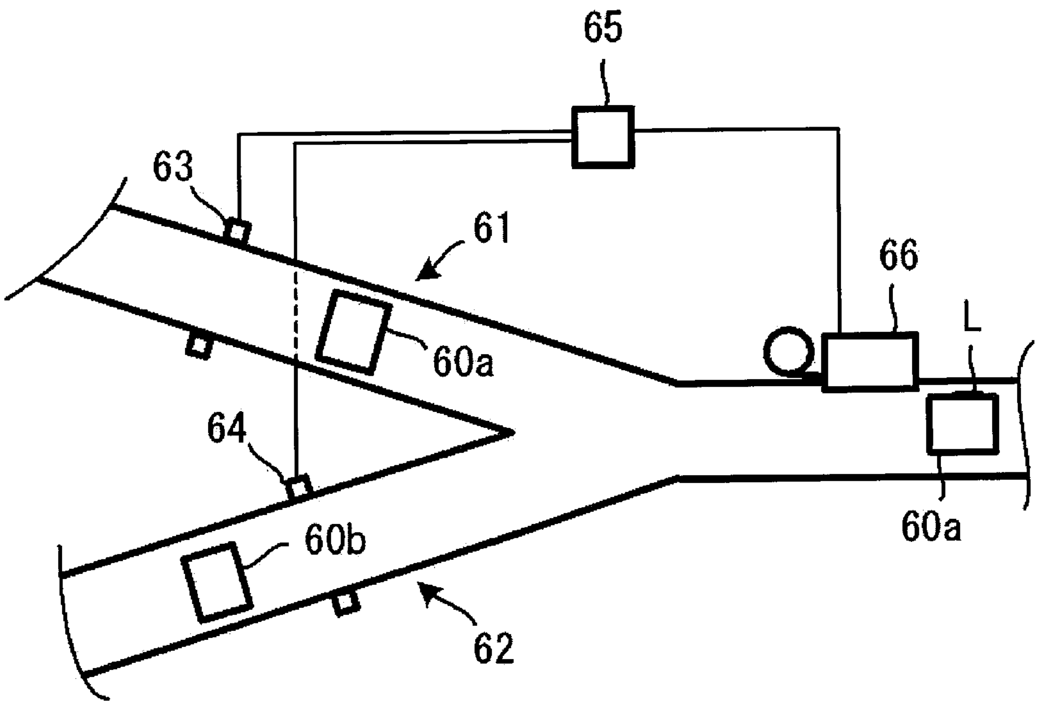
FIG. 6 shows a conventional label affixing system.

FIG. 1 is an overall schematic constitutional diagram showing an example of a label affixing system according to the present invention. FIG. 2 is a schematic constitutional diagram showing an example of a label affixing machine. FIG. 3 is a block diagram illustrating a printing control unit of the label affixing machine. FIG. 4 is a block diagram showing an example of a control box. FIG. 5 is a flowchart illustrating an operation of the label affixing system.

A label affixing system 1 mainly includes a conveyance line 2, a confluence line 3, an integrated line 4, an image capturing unit 5, and a label affixing machine 6.

On the conveyance line 2, a first conveyor (No. 1) 7 and a second conveyor (No. 2) 10 are arranged side by side.

A plurality of rollers 8 . . . 8 are arranged in parallel on the first conveyor 7, and when the rollers 8 . . . 8 are driven by driving a motor M1, they are capable of conveying a packaging box (conveyed object) P1 from an upstream side to the confluence line 3 to be described below.

A plurality of rollers 11 . . . 11 are arranged in parallel on the second conveyor 10, and when the rollers 11 . . . 11 are driven by driving a motor M2, they are capable of conveying a packaging box (conveyed object) P2 from the upstream side to the confluence line 3 to be described below.

The first conveyor 7 and second conveyor 10* are provided with separate motors M1, M2 so that they can be driven and stopped independently.

The confluence line 3 mainly includes a confluence conveyor 13, guide plates* 14*a*, 14*b*, and the image capturing unit 5.

A plurality of rollers 15 . . . 15 are arranged in parallel on the confluence conveyor 13, and when a motor M3 is driven, the rollers 15 . . . 15 can convey the packaging box P1 or the packaging box P2 conveyed by the first conveyor 7 or the second conveyor 11.

The guide plate 14*a* may be provided on the confluence conveyor 13 to guide the packaging box P1 toward the integrated line 4, to be described below. Further, the guide plate 14*b* may be provided to guide the packaging box P2 toward the integrated line 4, to be described below.

The guide plate 14*a* may be provided on one roller support portion 9 for supporting the plurality of rollers 15 . . . 15, and the guide plate 14*b* may be provided on another roller support portion 12 for supporting the plurality of rollers 15 . . . 15.

The guide plate 14*a* and the guide plate 14*b* are disposed in a substantially V-shaped form to guide the packaging boxes P1, P2 toward the integrated line 4.

The image capturing device (image capturing unit) 5 is provided on an upstream side end portion of the guide plate 14*a* in a conveyance direction of the packaging box P1.

The image capturing device 5 may be provided with a CCD (Charge Coupled Device) 16 that includes a control box 55 and captures a diagonally frontward image of the packaging boxes P1, P2 as the packaging boxes P1, P2 are conveyed in parallel.

The CCD 16 is provided at an angle of 30° to 45° relative to the conveyance direction of the packaging boxes P1, P2.

Further, a distance measurement unit 57 for measuring a distance to the respective packaging boxes P1, P2 on the basis of data relating to the image of the conveyed packaging box P1 or the conveyed packaging box P2 captured by the CCD 16 may be provided in the control box 55 to be described below.

The control box 55 may include the distance measurement unit 57, a line determination* unit 58, a communication control unit 59*, and interfaces 56*a*, 59*a*.

The line determination unit 58 is capable of setting threshold data.

The threshold data are data indicating a distance between the CCD 16 and a boundary position between the first conveyor 7 and second conveyor 10 arranged side by side.

The line determination unit 58 is capable of receiving distance data relating to the packaging boxes from the distance measurement unit 57.

The line determination unit 58 is also capable of comparing the distance data obtained from the distance measurement unit 57 to the threshold data.

When the distance data are determined to be shorter than the threshold data as a result of the comparison between the distance data and the threshold data, the packaging box P1 conveyed by the first conveyor 7 can be determined.

When the distance data are determined to be longer than the threshold data as a result of the comparison between the distance data and the threshold data, the packaging box P2 conveyed by the second conveyor 10 can be determined.

The communication control unit 59 is capable of supplying a signal to the label affixing machine 6 via the interface 59*a* on the basis of the result obtained by the line determination unit 58.

Further, the image data from the CCD 16 can be supplied to the control unit 56 via the interface 56*a*.

The control unit 56 is capable of driving and stopping the motors M1, M2, and can perform control to ensure that signals are supplied to the respective motors M1, M2 via an interface not shown in the drawings.

Further, when the packaging boxes P1, P2 are conveyed simultaneously, the control unit 56 is capable of measuring the distance to the packaging boxes and recognizing the packaging box P1 having the shortest distance preferentially.

The control unit 56 is capable of performing control to halt driving of the second conveyor 10 after detecting the packaging box P1 conveyed by the first conveyor 7.

Further, the control unit 56 is capable of performing control to halt driving of the first conveyor 7 after detecting the packaging box P2 conveyed by the second conveyor 10.

When the packaging box P1 conveyed by the first conveyor 7 is detected on the basis of the result generated by the line determination unit 58 provided in the control unit 56, a first signal can be supplied to the label affixing machine 6.

When the packaging box P2 conveyed by the second conveyor 10 is detected on the basis of the result generated by the line determination unit 58* provided in the control unit 56, a second signal can be supplied to the label affixing machine 6.

Thus, a different signal can be supplied to the label affixing machine 6 depending on the type of the packaging box.

The integrated line 4 mainly includes an integrated conveyor 17 and the label affixing machine 6.

A plurality of rollers 18 . . . 18 are arranged in parallel on the integrated conveyor 17, and by driving a motor M4, the rollers 18 . . . 18 can be driven to rotate.

By driving the rollers 18 . . . 18 to rotate, the packaging boxes conveyed from the confluence conveyor 13 can be conveyed to a downstream side of the integrated conveyor 17 (from left to right in FIG. 1).

The label affixing machine 6 is disposed to the side of the integrated conveyor 17 to be capable of affixing a label L onto a side face of the conveyed packaging boxes.

The integrated conveyor 17 is also provided with a guide plate 39, and the packaging boxes are guided along the guide plate 39 toward the label affixing machine 6, to be described below.

Next, the label affixing machine 6 will be described on the basis of FIG. 2.

The label affixing machine 6 mainly includes a sheet supply unit 20, a printing unit 21, a peeling unit 22, a backing sheet winding unit 23, and a printing control unit 24.

The sheet supply unit 20 may be provided with a sheet supply shaft 25 for rotatably holding a roll-form label continuous body C in which a plurality of labels L are temporarily adhered to a strip-form backing sheet D at predetermined intervals.

The label continuous body C fed from the sheet supply shaft 25 is conveyed to the printing unit 21 via a guide roller 26.

The printing unit 21 is provided with a platen roller 27 and a thermal head 28, and the thermal head 28 is provided to be free to contact and separate from the platen roller 27.

A ribbon supply shaft 29 and a ribbon winding shaft 30 are disposed above the thermal head 28. A roll-form ink film 31 may be held rotatably on the ribbon supply shaft 29.

The ink film 31 fed from the ink supply shaft 29 can be conveyed to the ink film winding up shaft 30 passing between the label continuous body C and the thermal head 28.

The ink film winding shaft 30 is capable of winding up the ink film 31 when that shaft is driven to rotate by a drive source, not shown in the drawings.

The label continuous body C and the ink film 31 can be sandwiched between the platen roller 27 and the thermal head 28.

When the label continuous body C and the ink film 31 are sandwiched between the platen roller 27 and the thermal head 28, the platen roller 27 is driven on the basis of a printing start signal issued by the printing control unit 24, to be described below, and as a result, ink on the ink film 31 is transferred onto the label L, whereby printing information such as alphabetic characters or a barcode can be printed onto the label L.

The printed label L is conveyed toward the peeling unit 22.

Note that an example in which information such as alphabetic characters or a barcode is printed by transferring ink onto the label L was described above, but thermal paper in which the label L is provided with a heat-sensitive development layer may be used.

The strip-form backing sheet D of the printed label L is turned back by a peeling plate 32 provided in the peeling unit 22 such that the label L is peeled away from the strip-form backing sheet D by the rigidity of the label L. The peeled label L can then be affixed to the side face of the packaging box conveyed by the integrated conveyor 17.

The strip-form backing sheet D turned back by the peeling plate 32 is wound onto a backing sheet winding shaft 34 provided in the winding portion 23 via a guide roller 33.

Note that a peeling speed at which the label L is peeled and a conveyance speed of the packing boxes may be set to be identical or substantially identical.

A pitch detection sensor 35 is disposed below the conveyance path of the label continuous body C between the sheet supply unit 20 and the printing unit 21.

The pitch detection sensor 35 is capable of detecting a pitch mark (not shown) formed on a rear surface side (the opposite surface to the surface on which the labels are temporarily adhered) of the strip-form backing sheet D.

The pitch mark may be printed in advance as a black stripe.

An object detection unit 36 is provided to the side of the integrated conveyor 17.

The object detection unit 36 includes a light emission unit 37 and a light reception unit (not shown), which may be provided respectively on one side and the other side of a width direction of the integrated conveyor 17.

The object detection unit 36 is disposed such that under normal circumstances, light emitted from the light emission unit can be received by the light reception unit. The object detection unit 36 is also capable of supplying a signal to the printing control unit 24 upon detection of a packaging box passing between the light emission unit and the light reception unit while being conveyed by the integrated conveyor 17.

The printing control unit 24 is capable of supplying the printing start signal to the printing unit 21 at a predetermined timing upon reception of the signal from the object detection unit 36.

Next, the printing control unit 24 of the label affixing machine 6 will be described on the basis of FIG. 3.

In the printing control unit 24, a ROM (read only memory) 41 storing a predetermined control program, a CPU (central processing unit) 40 that is operated in accordance with the control program stored in the ROM 41 to control the various units, a RAM (random access memory) 42 storing various data required in an operation of the CPU 40, a platen control circuit 43 that supplies a pulse signal to a stepping motor 44, thereby driving the stepping motor 44 to rotate such that the platen roller 27 is driven to rotate, a backing sheet winding control circuit 45 that supplies a pulse signal to a stepping motor 46 for winding the strip-form backing sheet D under the control of the CPU 40, thereby driving the stepping motor 46 to rotate such that the backing sheet winding shaft 34 is driven to rotate, a head control circuit 47 for generating a control signal corresponding to the printing data to be printed, such as alphabetic characters, graphics, or a barcode, under the control of the CPU 40 and supplies the generated control signal to the thermal head 28 to activate a printing operation, a pitch sensor control circuit 48 that controls the light emission unit of the pitch detection sensor 35 under the control of the CPU 40 such that light is emitted, receives an electric signal output by the light reception unit, and supplies the pitch mark to the CPU 40 as detection data, a data storage unit 54 capable of reading the printing format and the printing information under the control of the CPU 40, an input unit 50 for inputting various data and commands into an interface 49 under the control of the CPU 40, and a display unit 51 for displaying input data input through the input unit 50 and various information, are connected.

Further, the CPU 40 is capable of receiving a signal from the control box 55 of the image capturing unit 5 via an interface 52 and specifying either the packaging box P1 or the packaging box P2 from the received signal.

Further, a detection signal from the object detection unit 36 is supplied to the CPU 40 via an interface 53.

Next, the label affixing system will be described on the basis of the flowchart shown in FIG. 5.

In a step S1, a determination may be made as to whether or not a packaging box has been detected by the CCD 16.

When a packaging box has been detected, the routine advances to a step S2, and when a packaging box has not been detected, the routine returns to the step S1, in which the processing of the step S1 is executed repeatedly.

When a packaging box is detected by the CCD 16 in the step S1, the routine advances to the step S2, in which the distance between the packaging box and the CCD 16 is measured.

By measuring the distance between the packaging box and the CCD 16, a determination as to whether or not the detected packaging box is the packaging box P1 conveyed by the first conveyor 7 or the packaging box P2 conveyed by the second conveyor 10 can be made.

When, as a result of a comparison between the packaging box distance and the threshold, it is determined that the detected packaging box is the packaging box P1 conveyed by the first conveyor 7, the routine advances to a step S3, and when it is determined that the detected packaging box is the packaging box P2 conveyed by the second conveyor 10, the routine advances to a step S8.

When the first conveyor 7 is determined in the step S2, the routine advances to the step S3, in which the motor M2 driving the second conveyor 10 is stopped and a first signal indicating the packaging box P1 of the first conveyor 7 is supplied from a control unit 19 of the image capturing unit 5 to the label affixing machine 6, whereupon the routine advances to a step S4.

In the step S4, the printing control unit 24 of the label affixing machine 6 calls up a preset first printing format A and first printing information relating to the packaging box P1 of the first conveyor 7 and corresponding to the first signal, whereupon the routine advances to a step S5.

In the step S5, a determination is made as to whether or not the packaging box P1 conveyed by the integrated conveyor 17 has been detected by the object detection unit 36. When the object detection unit 36 detects the packaging box P1, an affixing signal is supplied to the printing control unit 24 of the label affixing machine 6, whereupon the routine advances to a step S6.

When the packaging box P1 is not detected in the step S5, the routine returns to the step S5, in which the processing of the step S5 is executed repeatedly.

In the step S5, a determination may be made as to whether or not the packaging box P1 has been detected by the object detection unit 36.

When the object detection unit 36 detects the packaging box P1, the routine advances to the step S6, and when the packaging box P1 is not detected, the routine returns to the step S5, in which the processing of the step S5 is executed repeatedly.

In the step S6, the platen roller 27 is driven and the first printing pattern is printed onto the label L on the basis of the first printing format and the first printing information. The routine then advances to a step S7.

In the step S7, the label L printed with the first printing pattern is peeled away from the strip-form backing sheet D by the peeling plate 32, whereupon the label L printed with the first printing pattern is affixed to the side face of the conveyed packaging box P1. The routine is then terminated.

Here, when the first conveyor is driven and an image of the packaging box P1 conveyed by the first conveyor 7 is captured by the CCD 16, the second conveyor 10 may be stopped.

Further, when the packaging box P1 is not conveyed by the first conveyor 7, the second conveyor 10 may be driven such that both the first conveyor 7 and the second conveyor 10 are driven.

Meanwhile, when the second conveyor 10 is determined in the step S2, the routine advances to the step S8, in which the motor M1 for driving the first conveyor 7 is stopped and a second signal indicating the packaging box P2 of the second conveyor 10 is supplied from the control unit 19 of the image capturing unit 5 to the label affixing machine 6, whereupon the routine advances to a step S9.

In the step S9, the printing control unit 24 of the label affixing machine 6 calls up a preset second printing format B and second printing information relating to the packaging box P2 of the second conveyor 10 and corresponding to the second signal, whereupon the routine advances to the step S5.

In the step S5, a determination is made as to whether or not the packaging box P2 conveyed by the integrated conveyor 17 has been detected by the object detection unit 36. When the object detection unit 36 detects the packaging box P2, the routine advances to the step S6, and when the packaging box P2 is not detected, the routine returns to the step S5, in which the processing of the step S5 is executed repeatedly.

When the object detection unit 36 detects the packaging box P2 in the step S5, the routine advances to the step S6, in which the platen roller 27 is driven and the second printing pattern is printed onto the label L on the basis of the second printing format and the second printing information. The routine then advances to the step S7.

In the step S7, the label L printed with the second printing pattern is peeled away from the strip-form backing sheet D by the peeling plate 32, whereupon the label L printed with the second printing pattern is affixed to the side face of the conveyed packaging box P2. The routine is then terminated.

Here, when the second conveyor 10 is driven and an image of the packaging box P2 conveyed by the second conveyor 10 is captured by the CCD 16, the first conveyor 7 may be stopped.

Further, when the packaging box P2 is not conveyed by the second conveyor 10, the first conveyor 7 may be driven such that both the first conveyor 7 and the second conveyor 10 are driven.

An example in which the label affixing machine is disposed to the side of the integrated conveyor was described above, but the label affixing machine may be disposed on the upper side or the lower side of the conveyed packaging box such that the label can be affixed to the upper surface side or the bottom surface side of the packaging box.

Further, an example of a conveyance device having two conveyance lines, namely the first conveyor and the second conveyor, was described above, but three or more conveyance lines may be provided.

Further, the imaging device 5 including the CCD may be provided in a position where it does not contact the packaging box.

In this embodiment, the numbers, positions, shapes, and so on of the respective constitutional members are not limited to those described in the embodiment, and may be modified appropriately for the purpose of implementing the present invention. The present invention is not limited to the embodiment described above, and the embodiment may be modified appropriately within the scope of the technical spirit of the present invention.

What is claimed is:

1. A method of affixing a label to a conveyed object comprising:

conveying a conveyed object along a conveyance line;

capturing an image of said conveyed object as it is being conveyed;

converting data relating to said captured image to a measurement of a distance to said conveyed object;

selecting one printing format from a plurality of printing formats on the basis of said measured distance to said conveyed object;

printing a label with a selected said one printing format on the basis of said selected printing format; and affixing said printed label to said conveyed object.

2. The method of affixing a label to a conveyed object according to claim 1, wherein said conveyance line comprises a first conveyance line and a second conveyance line each for conveying objects, and said method further comprises:

specifying said first conveyance line or said second conveyance line by specifying said distance to said conveyed object on the basis of said data relating to said image captured by said image capturing means; and halting driving of one of said first and second conveyance lines after determining that said conveyed object is being conveyed by the other of said first and second conveyance lines.

3. The method of affixing a label to a conveyed object according to claim 1, further comprising storing said plurality of printing formats and said printing data and selecting said printing format and data from said stored formats and data.

4. The method according to claim 1, further comprising affixing said label to said object after said printing of said label.

5. A label affixing system operable for affixing a label to a conveyed object, the system comprising:

a conveyance line configured for conveying conveyed objects;

an image capture device configured for capturing an image of the conveyed objects on said conveyance line;

a measuring device configured and operable for measuring a distance from the image capture device to the conveyed object subject to the image capture;

a label affixing machine including a plurality of printed formats and including a selecting device configured and operable for selecting a respective one of the printing formats from the plurality of printing formats on the basis of the measured distance to a respective one of conveyed objects;

a printing device to which the printing format selecting device is connected, and the printing device being configured and operable for moving a label to the printing device and for printing the label with the selected printing format; and an affixing device positioned and configured for affixing the printed label to the one conveyed object, the distance of which from the image capture device had been measured.

6. The label affixing system of claim 5, wherein the conveyance line comprises at least a first and a second conveyance line at respective first and second distances from the image capture device, and the printing format selecting device being configured and operable to select the printing format based upon the measured distance of the one conveyed object.

7. The label affixing system of claim 6, wherein each of the first and second conveyance lines is configured and operable to convey ones of the objects thereon and to stop the conveyance of the objects thereon; the printing format selecting device being configured and operable to halt one of the first and second conveyance lines for an object that is not at a selected measured distance from the image capture device and to continue operation of the other of the first and second conveyance lines for the one object the distance of which from the image capture device has been measured as at the selected distance.

8. The label affixing system of claim 6, further comprising a storage device for storing the plurality of printing formats and printing data.

* * * * *